United States Patent
Koval et al.

(10) Patent No.: US 8,594,936 B1
(45) Date of Patent: Nov. 26, 2013

(54) PROVIDING CURRENT ESTIMATES OF PRECIPITATION ACCUMULATIONS

(75) Inventors: Joseph Paul Koval, Atlanta, GA (US);
Bruce L. Rose, Smyrna, GA (US);
Andrew Todd Cox, Atlanta, GA (US)

(73) Assignee: The Weather Channel, LLC, Atlanta, GA (US)

(*) Notice: Subject to any disclaimer, the term of this patent is extended or adjusted under 35 U.S.C. 154(b) by 809 days.

(21) Appl. No.: 12/347,457

(22) Filed: Dec. 31, 2008

(51) Int. Cl.
*G01W 1/00* (2006.01)

(52) U.S. Cl.
USPC ............................................................ 702/3

(58) Field of Classification Search
USPC ............................................................ 702/3
See application file for complete search history.

(56) References Cited

U.S. PATENT DOCUMENTS

| | | | |
|---|---|---|---|
| 6,952,648 B1* | 10/2005 | Menard et al. | 702/3 |
| 2004/0064255 A1* | 4/2004 | Egi | 702/3 |
| 2004/0215394 A1* | 10/2004 | Carpenter et al. | 702/3 |
| 2007/0103359 A1* | 5/2007 | Testud et al. | 342/26 R |
| 2009/0292470 A1* | 11/2009 | Curry | 702/3 |

OTHER PUBLICATIONS

Cobb, "A Simple Physically Based Snowfall Algorithm", 21st Conference on Weather Analysis and Forecasting~17th Conference on Numerical Weather Prediction, American Meteorological Society, 2005.*

\* cited by examiner

*Primary Examiner* — Aditya Bhat
(74) *Attorney, Agent, or Firm* — Meunier Carlin & Curfman, LLC (57) ABSTRACT

Liquid precipitation and snow precipitation measurements having a first resolution and spanning a first time period are aggregated with data from a computer generated model of current liquid precipitation and snowfall estimates having a second resolution and spanning a second time period to form near up-to-date estimates of liquid precipitation and snowfall over a determined time period. The measurements are received from various weather history data severs over a network. The data is processed into a gridded data set for a determined geographical region. The current conditions estimates are received over a network from a different sever. The processor then aggregates the processed liquid and snow precipitation estimates with the current precipitation estimates corresponding to the period from the most recent precipitation and snowfall data until present.

20 Claims, 5 Drawing Sheets

PROVIDING CURRENT ESTIMATES OF PRECIPITATION ACCUMULATIONS

BACKGROUND

The National Weather Service (NWS) and its hydrological division, the River Forecast Centers (RFC), collect precipitation accumulation data from a nationwide network of sampling stations. The NWS employs a sophisticated network of automated surface rainfall gauges and human observers, along with radar and satellite estimating techniques to derive highly accurate measurements of rainfall data from across the continental United States ("CONUS").

Similarly, the NWS' National Operational Hydrologic Remote Sensing Center ("NOHRSC") collects snowfall data from a variety of comprehensive sources including, for example, satellites, airborne platforms, and ground stations. The NOHRSC combines the data from these various sources to create snow precipitation measurements.

The NWS precipitation data is highly accurate and provides high resolution estimates of precipitation. The high fidelity of the data is the result not only of the sophisticated techniques that are used to collect the data, but also of the extensive data processing and quality control processing that takes place after the data is collected and prior to the data being released to the public. Data collected by the NWS typically undergoes extensive manual quality control procedures and is subject to automated collation, filtering, and mosaicing. This processing is intensive and often time consuming, resulting in several hours of delay between the time data is collected and when data is prepared for release to the public. For example, the NWS precipitation data that is eventually released to the public may be based on precipitation measurements taken 12 to 36 hours earlier. As a consequence, when NWS precipitation data is made available to the public, which generally takes place only once daily, the data may not reflect precipitation and/or snow that has fallen within the hours just prior to when the data is released to the public.

Precipitation data may be gathered from sources other than the NWS. For example, the High-Resolution Real-Time Synthetic Meteorological Conditions from Radar Data ("HIRAD") system described in U.S. Pat. No. 7,231,300, the contents of which are hereby incorporated by reference in their entirety, provides weather condition information, including, for example, precipitation data. The accuracy of the data from systems such as HIRAD is generally considered to be less than that offered by the NWS systems. However, in systems such as HIRAD, precipitation measurement data may be made available at relatively frequent intervals as compared to the data provided by the NWS. For example, weather condition information such as precipitation accumulation data may be made available, for example, every 20 minutes.

Thus, while precipitation data from the NWS is accurate and provides high resolution, the data may be delayed and may not reflect precipitation that has fallen in the immediate past. Precipitation data from other sources, such as, for example, HIRAD, may not be of the same quality as the NWS data, but the data is more immediately available and reflects recent precipitation.

SUMMARY

Applicants disclose systems and methods for providing current precipitation accumulation estimates. In an exemplary embodiment, the processing leverages both the high quality precipitation data that results from retrospective data analysis of sources such as the NWS, and the near-immediate precipitation data from sources such as HIRAD.

In an exemplary embodiment, a first set of precipitation data is received corresponding to a particular geographic region and for a particular time period. For example, NWS data may be received that reflects precipitation for a particular geographic area and for a time period spanning from a first time in the past to a second time in the past. For purposes of illustration, in an exemplary embodiment, data may be received that reflects precipitation occurring between 36 hours in the past, i.e, a first time, to 12 hours in the past, i.e, a second time.

In an exemplary embodiment, a second set of precipitation data is received that contains precipitation estimate data corresponding to the same geographic area but reflecting more recent or current measurements. For example, precipitation data may be received from HIRAD that reflects precipitation data for the same geographic area as reflected by the NWS data, but corresponding to a period of time from at least as far in the past as the second time for which the first set of data, e.g, the NWS data, was received, and continuing until a more recent time. For purposes of illustration, in an exemplary embodiment, data may be received that reflects precipitation from 12 hours in the past, i.e, the second time associated with the NWS data, until 20 minutes from the present time.

In an exemplary embodiment, the second set of precipitation data is aggregated with the first set of precipitation data. For example, precipitation data that was received from the NWS for a geographic region and reflecting precipitation measurements from a first time to a second time, may be aggregated with precipitation data from HIRAD corresponding to the same geographic region and reflecting precipitation data from at least the second point in time to a third point in time that is more recent. For purposes of illustration, in an exemplary embodiment, precipitation data from the NWS reflecting precipitation measurements from 36 hours in the past to 12 hours in the past, is aggregated with HIRAD data reflecting precipitation measurements from 12 hours in the past to 20 minutes from the present time.

In an exemplary embodiment, the first and second set of precipitation data may comprise, for example, measurements for either one or both of liquid precipitation and snow precipitation.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Overview

Precipitation data that is made available by the NWS is fairly accurate and has a relatively high resolution. However, the NWS data is often delayed and the data provided to the public may not reflect precipitation that has fallen during the period of delay. In non-NWS weather information systems such as HIRAD, the precipitation data that is made available may not be as skillfully collected and analyzed as that provided by the NWS, but the data is updated more frequently and reflects recent precipitation accumulations.

Applicants disclose systems and methods for providing current precipitation estimates. In an exemplary embodiment, a first set of precipitation data from a system such as, for example, NWS that reflects precipitation measurements that were taken at a point in the past, is combined with a second set of precipitation data from a system such as, for example, HIRAD. The second set of precipitation data reflects precipitation measurements from at least the point at which the first set of data ended, up through a more recent point in time which may be, for example, a matter of minutes in the past from the present time.

The aggregation of the first set of precipitation data with the second set of precipitation data results in a current precipitation measurement. By combining the delayed but high fidelity government weather service (NWS) estimates of melted liquid precipitation and snowfall with the readily available and timely estimates of melted liquid precipitation and snowfall from HIRAD, the system provides quality up-to-minute precipitation estimates for monthly, hourly, and/or seasonal precipitation.

Exemplary Computing Arrangement

Figure 1:
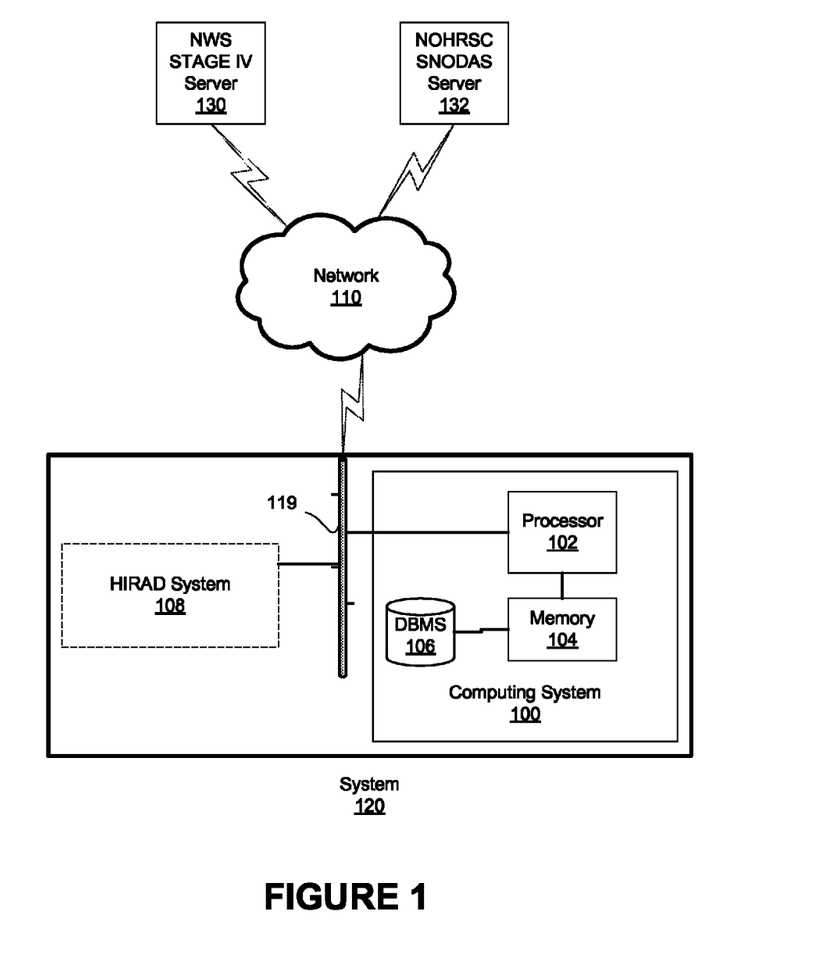
FIG. 1 is a block diagram of an exemplary system in which precipitation estimates may be generated.

FIG. 1 depicts an exemplary computing environment that may be employed in providing precipitation estimates. As shown in FIG. 1, computing system 100 is communicatively coupled via communications networks 110 and 119 to several precipitation data sources. In an exemplary embodiment, precipitation data sources comprise, for example, NWS stage IV server 130, NOHRSC SNODAS server 132, and HIRAD system 108.

Computing system 100 receives a first set of precipitation data from NWS Stage IV server 130 and/or NOHRSC SNODAS server 132. The data may be received, for example, in response to a request from computing system 100 and/or as an automated, regularly scheduled download of information. The first set of precipitation data may reflect precipitation measurements from a first point in the past through to a second point in the past. For example, in an illustrative embodiment, the first set of precipitation data may comprise data collected for a period from 36 hours in the past, i.e., a first point in the past, to 12 hours in the past, i.e., a second point in the past. Upon receipt of the first set of precipitation information from NWS Stage IV server 130 and/or NOHRSC SNODAS server 132, computing system 100 stores the data in database 106 for later processing and retrieval. The database of information comprises the first set of data as well as data that has been previously downloaded from NWS Stage IV server 130 and/or NOHRSC SNODAS server 132.

Computing system 100 also receives a second set of precipitation data from HIRAD system 108. The second set of precipitation data may be received, for example, in response to a request and/or as part of an automatic, regularly scheduled download. The second set of precipitation data comprises precipitation data estimates (both liquid and snow) from a point in time at least as far back in time as the second point, i.e., the end time for the first set of data, and continues up through to a more recent point in time. For example, in an illustrative embodiment, the second set of precipitation data may comprise data collected for a period from 12 hours in the past, i.e. the second point in time, up through until 20 minutes in the past. Computing system 100 stores the second set of data, perhaps in database 106 stored in memory 104, for later processing and/or retrieval. The second set of data is added to information that has previously been downloaded from HIRAD system 108.

Computing system 100 aggregates the first set of data and the second set of data so as to arrive at precipitation accumulation data for the geographic area from at least the first point in time up through a relatively recent point in time. Computing system 100 retrieves information that was previously downloaded from NWS Stage IV server 130 and/or NOHRSC SNODAS server 132. The information may be retrieve from, for example, database 106 that may be stored in memory 104. The retrieved information may extend back in time for any length that is supported by the stored data. For example, if precipitation data that has previously been downloaded from NWS Stage IV server 130 and/or NOHRSC SNODAS server 132 has been accumulated for a period one or more years, months, or days, computing system 100 may aggregate the precipitation measurements for such length of time up through the most recent time for which data has been received. The particular length of time for which aggregation may be performed may be determined selectively by user input.

Computing system 100 similarly aggregates then aggregates the data that has been retrieved from the HIRAD system 108. In an exemplary embodiment, computing system 100 aggregates data received from HIRAD at least from a time at which the NWS data ends up through some more recent time. For purposes of illustration, computing system 100 may aggregate the HIRAD data beginning from a time 12 hours in the past, which is the time for which the most recent set of NWS data corresponds, up through the time for which the latest set of HIRAD data was received, which may be 20 minutes in the past.

Finally, the aggregated data from NWS Stage IV server 130 and/or NOHRSC SNODAS server 132 is aggregated with the aggregated HIRAD data. For any arbitrary location within the CONUS, computing system 100 may combine, on a near real-time basis, Stage IV data, SNODAS data, and HIRAD data to provide seamless estimates of precipitation amounts for monthly, yearly and seasonal time periods.

Computing system 100 may be, for example, a typical computing environment adapted for data processing. In an exemplary embodiment, computing system 100 comprises computing processor 102 and memory 104 communicatively coupled to processor. Computing system 100 may further comprise a database 106 which in an exemplary embodiment may be stored in memory 104. Processor 102 is adapted to execute computer-executable instructions and to process data. In particular processor 102, may be adapted to operate as described herein to receive and process precipitation data. Memory 104 is adapted to store executable instructions that are executable by processor 102 and allow for processor 102 to perform processing as described herein. Memory 104 may further comprise data that is operated upon by processor 102. For example, data may comprise precipitation data as described herein. In an exemplary embodiment, database management system 106 operates to manage the retrieved precipitation data. In particular, database 106 may be used to store precipitation data that is received from NWS Stage IV server 130, NOHRSC SNODAS server 132, and HIRAD system 108, as well as to store aggregated data. Memory 104 may be any type of memory that is suitable for the particular environment and application. For example, memory 104 may be fixed and/or removable and may comprise: RAM, ROM, a hard drive, CD ROM, USB storage device and the like. Those skilled in the art will appreciate that computing system 100 may comprise additional components traditionally associated with computing systems including, for example, input/output devices such as a display, a keyboard, a mouse, etc.

In an exemplary embodiment, computing system 100 is communicatively coupled to network 119. Network 119 may comprise any communication topology and technology suitable for communication as described herein. For example, network 119 may comprise any of wireline or wireless topology and make use of various protocols such as for example, TCP/IP. In an exemplary embodiment, network 119 may be, for example, a local area network or intranet.

Network 110 is adapted to provide communication between computing system 110 and precipitation data sources 130, 132. Network 110 may comprise any communication network topology and networking technology suitable for providing the described communication. For example, network 110 may comprise any of LAN, WAN, and/or internet topologies. In an exemplary embodiment, network 110 comprises the Internet and the World Wide Web.

Computing system 100 communicates over network 110 to receive precipitation data from at least one weather data source. The precipitation data may comprise any type of data identifying the precipitation accumulation for a geographic area during a defined period of time. The precipitation data may comprise, for example, data relating to liquid precipitation, snow precipitation, and/or any other type weather precipitation.

In an exemplary embodiment, computing system 100 receives precipitation data from NWS stage IV server 130. Computing system 100 may download the NWS stage IV data from server 130 at regularly scheduled times when the data is typically made available to the public. NWS stage IV server 130 is a server system adapted to provide data sets comprising NWS stage IV data. Generally, NWS stage IV data refers to data collected by the NWS, and in particular to precipitation data that may be collected from a nationwide network of over 8,000 automated surface rainfall gauges, human cooperative observes, radar derived estimates of precipitation amount, and satellite-based estimates of precipitation amount. This data is collected, quality controlled and aggregated once daily, in this case, at 12:00 UTC (coordinated universal time) (7:00 am EST) into a uniform grid of data points at 4 km resolution that covers the continental United States. The process of collecting, quality controlling, and compositing the datasets is time consuming and labor intensive. Moreover, many of the input sources of data such as rain gauges and cooperative observations only report at certain times of the day and these reports themselves can be significantly delayed from the real or valid time of the observation. For example, a cooperative observer may report 24 hour accumulated rainfall once daily that is valid for 12Z to 12Z UTC. But this data might not be reported until late morning or early afternoon. In some instances, the data set representing the most recent twenty-four hours rainfall accumulation is not made available to the general public until some twelve or more hours after the valid measurement period has passed, i.e. from 12Z to 12Z UTC or 24 hours. A more extensive discussion of stage IV data may be found at http://www.srh.noaa.gov/rfcshare/precip_about.php, the contents of which are hereby incorporated by reference in their entirety. A more extensive discussion of quality control procedures for stage IV data may be found, for example, at http://www.emc.ncep.noaa.gov/mmb/ylin/pcpverif/scores/does/QandA.html, the contents of which are hereby incorporated by reference in their entirety. Those skilled in the art will appreciate that NWS Stage IV server 130 may operate on one or more computers comprising processors and computing memory.

In an exemplary embodiment, computing system 100 also receives precipitation data from NOHRSC SNODAS server 132. In an exemplary embodiment, computing system 100 may download the SNODAS data from server 132 at regularly scheduled times when the data is typically made available to the public. Generally, the data received from SNODAS server 132 is data from the NOAA National Weather Service's National Operational Hydrologic Remote Sensing Center (NOHRSC) SNOw Data Assimilation System (SNODAS). SNODAS is a modeling and data assimilation system developed by NOHRSC to provide the best possible estimates of snow cover and associated parameters to support hydrologic modeling and analysis. The aim of SNODAS is to provide a physically consistent framework to integrate snow data from satellite, airborne platforms, and ground stations with model estimates of snow cover. SNODAS includes procedures to ingest and downscale output from the Numerical Weather Prediction (NWP) models, and to simulate snowcover using a physically based, spatially-distributed energy- and mass-balance snow model. SNODAS also includes procedures to assimilate satellite-derived, airborne, and ground-based observations of snow covered area and Snow Water Equivalent (SWE). A more extensive discussion of SNODAS data may be found at http://inside.org/pubs/special/nside_special_report_11.pdf, the contents of which are hereby incorporated by reference in their entirety. Similarly to the liquid precipitation data provided by the NWS, snowfall precipitation data is often delayed due to the data collection techniques and the quality control processes employed. Thus, the actual measurements are often taken many hours before the precipitation data is made available to the public. Those skilled in the art will appreciate that NOHRSC SNODAS server 132 may operate on one or more computers comprising processors and computing memory.

Referring to FIG. 1, computing system 100 is communicatively coupled via network 119 to High Resolution Aggregate Data ("HIRAD") system 108 and downloads HIRAD precipitation data to computing system 100. HIRAD is a system that produces estimates of high-resolution current weather conditions at any point in the continental United States. Generally, HIRAD collects and updates its weather data several times per hour. In an exemplary embodiment, the HIRAD system provides updated precipitation estimates every 20 minutes. Accordingly, the HIRAD precipitation data is highly available and reflects up to the minute conditions. HIRAD routinely produces estimates of accumulated rainfall and snowfall, similar to that provided by the NWS, but without any of the temporal lag or delays that are inherent NWS server data. However, due to HIRAD's immediacy and real-time availability, there may be sources of observation information that are not real-time, and therefore not available to the HIRAD assimilation and estimation process. A more extensive discussion of the HIRAD system is provided in U.S. Pat. No. 7,231,300 the contents of which are hereby incorporated by reference in their entirety. Those skilled in the art will appreciate that HIRAD system 108 operates on one or more computers comprising processors and computing memory. Furthermore, those skilled in the art will appreciate that while FIG. 1 illustrates HIRAD system 108 as communicatively coupled to computing system 100, HIRAD system 108 may be implemented in whole or in-part on the same physical computing devices as computing system 100.

In an exemplary embodiment of the disclosed system, two sources of measured NWS data are utilized: Stage IV data for liquid precipitation, and SNODAS data for snow precipitation. Those skilled in the art will appreciate that in a potential embodiment, only one type of precipitation data may be desired. For instance, if only an up-to-date snowfall accumulation estimate is desired, then in the present embodiment, the Stage IV liquid precipitation may not be processed. On the other hand, if only a liquid precipitation estimate was desired, the SNODAS data would not be required. Furthermore, while NWS Stage IV data, NOHRSC SNODAS data, and HIRAD data are employed in an illustrative embodiment, one skilled in the art can appreciate that other sources of precipitation data could be used as data sources.

Precipitation Processing

Figure 2:
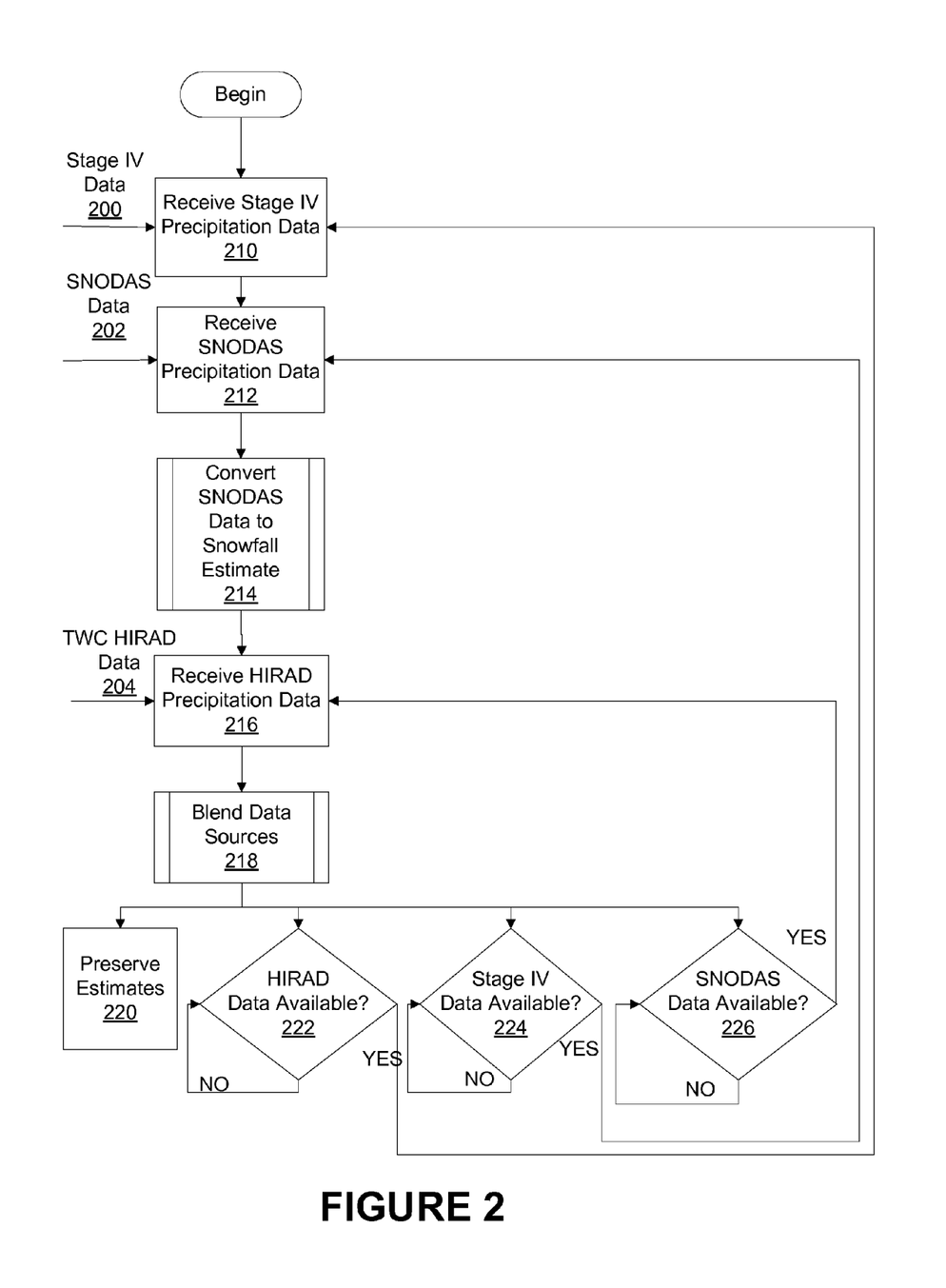
FIG. 2 is a flowchart of an illustrative method for generating estimates of precipitation accumulations.

FIG. 2 is a flowchart depicting an illustrative method for generating estimates of liquid and snow precipitation accumulations over a determined time period. At step 210, a system, such as computing system 100 of FIG. 1, receives Stage IV data 200 from the NWS Stage IV server 130. The data may be received in response to a request by computing system 100 and/or as the result of an automated regularly scheduled download. In an exemplary embodiment, updated Stage IV data is made available to the public at 24 hour intervals, and may be based upon precipitation measurements that were taken several hours (e.g., approximately 12-36 hours) prior to the data being made available to the public. The data generally comprises precipitation accumulation readings for a grid of points within a geographic area and during a particular period of time. For example, the data may comprise a value for precipitation accumulation for each of a plurality of locations during a period from a first point in time, which may be referred as T1, through to a second point in time, which may be referred to as T2.

The precipitation data, which in the case of Stage IV data generally reflects liquid precipitation, is stored in database 106 in memory 102. The data may comprise liquid precipitation estimates for a grid of points in a particular geographic area and for a particular period of time. In an exemplary embodiment, the data includes liquid precipitation accumulations at a plurality of grid points during a period beginning at a first time, e.g., 36 hours prior to the time of data being made available to the public, and ending at a second time, e.g., 12 hours prior to the time of data being made available to the public. The precipitation accumulations and data reflecting the corresponding time period, i.e. T1 and T2, to which the data corresponds is stored in database 106. The data may be stored with previously downloaded data. For example, database 106 may comprise Stage IV data that has been collected over past days, weeks, months, and/or even years. Storing such data allows for providing precipitation estimates for an extended period of time. Thus, computing system 100 stores the NWS data in database 106 so as to create a long daily history of NWS data compiled from a succession of daily downloads of 24-hour rainfall and snowfall estimates.

At step 212, the computing system 100 receives SNODAS data 202 from the NOHRSC SNODAS server 132 of FIG. 1.

The data may be received in response to a request by computing system 100 and/or as the result of an automated regularly scheduled download. In an exemplary embodiment, updated SNODAS data is made available to the public at 24 hour intervals, and may be based upon precipitation measurements that were taken several hours (e.g., approximately 12-36 hours) prior to the data being made available to the public. The data generally comprises snow precipitation accumulation readings for a grid of points within a geographic area and during a particular period of time. For example, the data may comprise a value for precipitation accumulation for each of a plurality of locations during a period from a first point in time, which may be referred as T1, through to a second point in time, which may be referred to as T2

The precipitation data, which in the case of SNODAS data generally reflects snow precipitation, is stored in database 106 in memory 102. The data may comprise snow precipitation estimates for a grid of points in a particular geographic area and for a particular period of time. In an exemplary embodiment, the data includes snow precipitation accumulations at a plurality of grid points during a period beginning at a first time, e.g., 36 hours prior to the time of data being made available to the public, and ending at a second time, e.g., 12 hours prior to the time of data being made available to the public. The precipitation accumulations and data reflecting the corresponding time to which the data corresponds is stored in database 106. The data may be added to previously downloaded data. For example, database 106 may comprise SNODAS data that has been collected over the past days, weeks, months, and/or even years. Storing such data allows for provides precipitation estimates for an extended period of time. Thus, computing system 100 stores the NWS data in database 106 so as to create a long daily history of NWS data compiled from a succession of daily downloads of 24-hour rainfall and snowfall estimates.

In a potential embodiment, the SNODAS data 202 received at step 212 may be a liquid snow water equivalent estimate. In other words, the data received is an estimate of the liquid equivalent of the snowfall that a region received. In another potential embodiment, snow data that is received might be in the form of a snowfall accumulation estimate. One skilled in the art can appreciate that either type of precipitation data could be received according to the systems and methods described herein.

In some instances where liquid snow water equivalent data is received, it may be desirable to provide snowfall estimates in inches rather than the equivalent liquid snow water equivalent estimate, which, although measured in inches, is not representative of the total snowfall an area has received. Accordingly, in an embodiment wherein at step 212 SNODAS data is received in equivalent liquid snow water, at step 214, the received SNODAS data 202 may be converted from a liquid precipitation equivalent estimate into a total snowfall estimate. Any process suitable for performing such a conversion may be employed. One example process for such a conversion is described in connection with FIG. 4 below. Those skilled in the art will appreciate that in a potential embodiment, the snowfall data could be received directly as a snowfall estimate, rather than a liquid snow water equivalent estimate, and the conversion would not be necessary.

In order to create an accurate, near real-time estimate of seasonal precipitation, a third data source of data is made available. The third data source is adapted to provide precipitation data that corresponds to a time after the period to which the NWS data corresponds. For example, for purposes of illustration, NWS data received at steps 210 and/or 212 may correspond to precipitation data from a first time T1 through to a second time T2. In such an instance, a set of precipitation data may be received from HIRAD 108 that corresponds to precipitation from at leas the second time T2 through to a time closer to the present time. In more practical terms, if NWS data corresponds to precipitation measurements for the period from 36 hours in the past to 12 hours in the past, the set of data received from HIRAD 106 comprises data from at least time T2 through to a more recent time. The HIRAD system provides precipitation estimates for both liquid precipitation and snowfall precipitation. Those skilled in the art will appreciate that although the HIRAD data is used as a data source in an exemplary embodiment, any data source that provides estimates of the current conditions of liquid precipitation or snowfall estimates may be employed.

Referring to FIG. 2, at step 216, the HIRAD data 204 is received from HIRAD system 108. The data may be received in response to a request by computing system 100 and/or as the result of an automated regularly scheduled download. In an exemplary embodiment, updated HIRAD data may be available at relatively frequent intervals, and may be based upon precipitation measurements or estimates that were taken relatively recently. For example, HIRAD data may reflect precipitation measurements or estimates that were taken as recently as 20 minutes in the past. The data generally comprises both liquid precipitation and snow precipitation accumulation readings for a grid of points within a geographic area and during a particular period of time. For example, the data may comprise a value for precipitation accumulation for each of a plurality of locations during a period of time that spans at least from the time for which NWS data ended, i.e. time T2. For purpose of illustration, if the NWS data received at steps 210 and 212 corresponds to a period from T1 through T2, HIRAD data may cover a period of time from at least time T2 through to a time closer in proximity to the then present time. As described below in connection with step 222, there may be several updates of HIRAD data before an update is received for the NWS data. In such a case, subsequent downloads of HIRAD data may occur for precipitation data that was collected since the last HIRAD data was downloaded. The received HIRAD data is stored in database 106. In an exemplary embodiment, the data is stored with an identification of the time period for which it covers. The stored HIRAD data may be employed to fill in the gaps between the last NWS data and the present time. Because the HIRAD data is used only to fill in the gaps, which typically might only be a day in length, in a potential embodiment it may only be necessary to maintain a few days worth of HIRAD data.

At step 218, the NWS liquid precipitation data, NWS snowfall estimate data, and HIRAD data are blended or aggregated. In other words, data from the HIRAD data is used to fill-in the NWS precipitation accumulations beginning at the time when the NWS data ends. For purposes of illustration, if the NWS precipitation data ended 24 hours in the past, HIRAD data reflecting precipitation that occurred from 24 hours in the past to some more recent time, e.g. 20 minutes in the past, is aggregated with the NWS data. As a result of the aggregation, for each data point, a precipitation accumulation value is derived reflecting the NWS data and the HIRAD data and providing precipitation accumulations that are near real-time and certainly more current than the NWS data alone.

Those skilled in the art will appreciate that potential embodiments might calculate precipitation estimates for any number of time periods. Yearly, seasonal, monthly, weekly estimates and the like are all possible aggregation outputs. Additionally, year-to-date, month-to-date, week-to-date accumulation estimates and the like could all be results of the aggregation process of step 218. Any method suitable for aggregating the NWS data and HIRAD data may be employed. An exemplary process for performing aggregation step 218 is described below in connection with FIG. 3. Those skilled in the art will also appreciate that the aggregation of data may be performed on demand and reported out to the requesting person and/or device.

The precipitation estimates that are derived at step 218 are preserved at step 220 for subsequent output and/or for use in later processing. In an exemplary embodiment, the precipitation estimates may be stored in database 106 and be available for querying at a later time. In an exemplary embodiment, the aggregated data may be made available for use in related processing. For example, the aggregated data may be made available for use by HIRAD system 108.

In an exemplary embodiment, HIRAD system 108 provides precipitation estimates at regular intervals which may be, for example, every twenty minutes. Accordingly, more up-to-date precipitation estimates may be made whenever the new HIRAD data becomes available. In an exemplary embodiment, at step 222, computing system 100 determines whether more recent HIRAD estimates are available. For example, at step 222, computing system 100 may check an internal timer corresponding to scheduled updates of HIRAD data. Alternatively, computing system 100 may communicate with HIRAD system 108 to determine the status of updated precipitation data. The process of determining whether updated data exists may be performed as frequently as necessary for the desired implementation.

If at step 222, it is determined that more recent precipitation data is available from HIRAD 106, processing continues at step 216 where the updated HIRAD precipitation data is received. Thereafter, the new HIRAD data may be aggregated with the existing HIRAD data and the aggregated HIRAD data aggregated with NWS data to derive a new set of precipitation estimates. If at step 222, it is determined that more recent precipitation data is not available from HIRAD system 106, computing system 100 continues to wait for an indication that the data has been updated.

In an exemplary embodiment, Stage IV and SNODAS data becomes available periodically, which may be, for example, every 24 hours. In a potential embodiment, updated NWS data may be used in deriving precipitation estimates as soon as the data becomes available. Accordingly, at step 224, computing system 100 determines whether updated NWS Stage IV has become available. Similarly, at step 226, computing system 100 determines whether updated SNODAS data has become available. Computing system 100 may accomplish this by checking an internal clock identifying scheduled times at which NWS data is updated. Alternatively, computing system 100 may communicate with serves 130 and 132 to determine whether updates have been made.

If at either of steps 224 or 226, it is determined that updated NWS data is available, the processing continues at either of steps 210 or 212 as appropriate to receive the updated data. Thereafter, processing continues as described above to derive precipitation estimates reflecting the updated NWS data. It at steps 224 and 226, it is determined that updated data is not available, computing system 100 continues to monitor for any such updates.

Aggregating Precipitation Data

Figure 3:
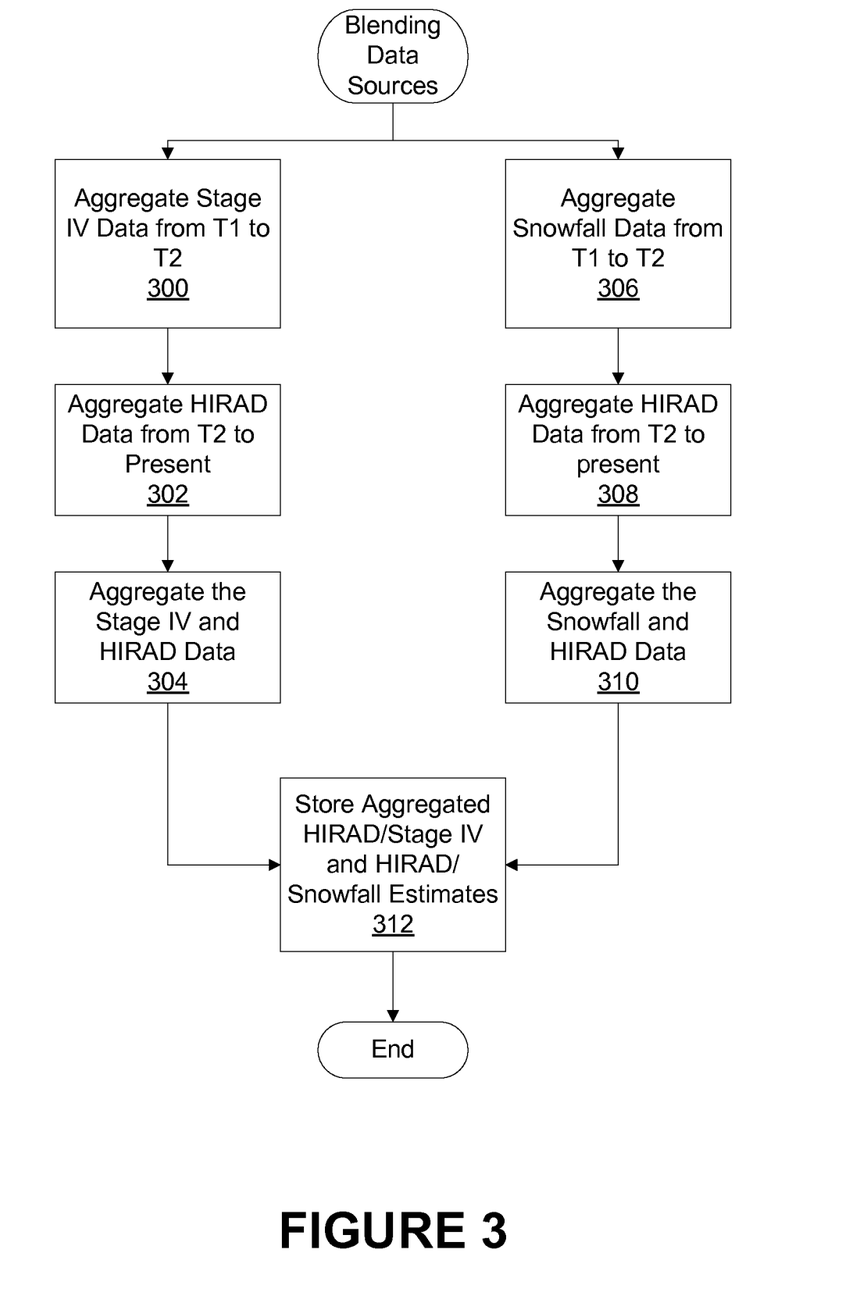
FIG. 3 is a flowchart of an illustrative method for blending liquid and snowfall measurements with the current conditions estimates.

FIG. 3 is a flow diagram of an illustrative method of blending or aggregating liquid and snowfall measurements with the current conditions estimates. The process of FIG. 3 may correspond, for example, to the processing associated with step 218 as described above in connection with FIG. 2. Referring to FIG. 3, at step 300, computing system 100 aggregates the Stage IV data for each grid point for a prescribed period of time. The prescribed period of time may be any time period that is dictated. For example, aggregated readings for weekly, monthly, seasonal, and yearly may be provided. In an exemplary embodiment, the Stage IV data comprises daily precipitation readings for points in the CONUS. In an exemplary embodiment, each of the gridded Stage IV precipitation estimates corresponds to a 24 hour period within the past 365 days. Thus, aggregating Stage IV data may comprise aggregating the precipitation for the individual days in the prescribed period of time. For example, to calculate a month-to-date estimate, the estimates beginning with the data corresponding to the first day of the current month until the data corresponding to the desired date T2 is aggregated for each gridded point in the desired geographic area, which may be the CONUS. This aggregation of data corresponds to an estimate of the total rain accumulation from the first of the month until time T2.

At step 302, computing system 100 aggregates the HIRAD liquid precipitation data beginning with time T2 and ending with the most recent estimate for each gridded point in the desired geographic area. In an illustrative embodiment, it may be 24 hours between updates to NWS data. During that 24 hour period, there may be numerous updates of HIRAD data. Thus, at step 302, computing system 100 may determine the temporal gap between the most recent valid NWS data and the present time. Computing system 100 aggregates the HIRAD data that is received since the last NWS update so as to provide an estimate of the precipitation since the last NWS updated. Since the HIRAD system is updated every 20 minutes, the aggregated HIRAD data is effectively an estimate of the liquid precipitation accumulation for time T2 until present for each gridded point within the CONUS.

At step 304, the Stage IV data for the time period beginning with the point of time that corresponds to the start of the desired estimate T1 until time T2 and the HIRAD data corresponding to time T2 until the most recent reading are added together for each gridded point within the particular geographic area. The result is a highly accurate, up-to-the-minute estimate of the liquid precipitation for the desired area during the desired time period. Thus, the HIRAD data is used to fill the gap between the present time and the last NWS reading.

At step 306, computing system 100 aggregates SNODAS data for a prescribed period of time. The prescribed period of time may be any time period that is dictated. For example, aggregated readings for weekly, monthly, seasonal, and yearly may be provided. The snowfall estimates contain the daily snowfall accumulations for gridded points in the desired area which may be the CONUS. In an exemplary embodiment, each of the gridded snowfall estimates corresponds to a 24 hour period within the past 365 days. Thus, aggregating Stage IV data may comprise aggregating the precipitation for the individual days in the prescribed period of time. For example, to calculate a month-to-date estimate, the estimates beginning with the data corresponding to the first day of the current month until the data corresponding to the end date T2 is aggregated for each gridded point in the desired geographic area, which may be the CONUS. This aggregation of data corresponds to an estimate of the total rain accumulation from a first of the month until time T2.

At step 308, computing system 100 aggregates the HIRAD snowfall data beginning with time T2 and ending with the most recent estimate is aggregated for each gridded point in the CONUS. In an illustrative embodiment, it may be 24 hours between updates to NWS data. During that 24 hour period, there may be numerous updates of HIRAD data. Thus, at step 308, computing system 100 may determine the temporal gap between the most recent valid NWS data and the present time. The HIRAD data that is received since the last NWS update may be aggregated so as to provide an estimate of the precipitation since the last NWS updated. Since the HIRAD system is updated every 20 minutes, the aggregated HIRAD data is effectively an estimate of the snowfall accumulation for time T2 until present for each gridded point within the CONUS.

At step 310, the snowfall estimate data for the particular geographic area and desired time period beginning with the point of time that corresponds to the start of the desired estimate until time T2 and the HIRAD data corresponding to time T2 until the most recent data are added together for each gridded point within the CONUS. The result is a highly accurate, up-to-the-minute estimate of the total snowfall accumulation for a desired time period.

At step 312, the estimates of liquid precipitation and snowfall for each point in the desired geographic area during the determined time period are stored in database 106 and/or communicated to the person/entity that requested the data. Additionally, in a similar manner as the one described above, yearly, seasonal, monthly, weekly estimates or the like can also be determined for the gridded points within the CONUS and stored in database 106. One skilled in the art will recognize that the calculated estimates do not have to be stored in database 106, but may be transmitted to another system for use or storage and/or for presentation in electronic or other form. The estimates could be transmitted locally, or over network 110 or the like. Furthermore, the estimates may be aggregated on request and presented to a system operator on request.

Converting Snow Water Estimates

Figure 4:
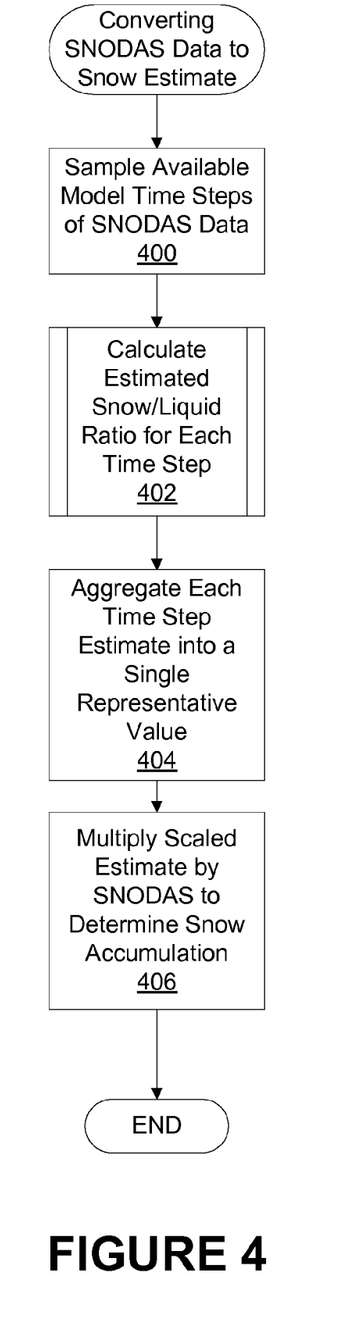
FIG. 4 is a flowchart of an illustrative method for converting a snow water equivalent estimate into gridded snowfall accumulation estimate.

FIG. 4 is a flow diagram of an illustrative method for converting snow water equivalent estimates into to a total snowfall accumulation estimate. Such a process may be selectively used in instances where the NWS data is reported in snow water equivalent values and it is desired to report snowfall in snowfall accumulation rather than snow water equivalent values. Such a method for converting may be used, for example, at a step 214 of FIG. 2.

In an exemplary embodiment, SNODAS data may be updated once a day. An updated estimate consists of the total liquid snow water equivalent for the previous 24 hours. However, one skilled in the art will appreciate that in other potential embodiments, the updates may be received more or less often and contain several estimates over the sampling period or the like.

In an exemplary embodiment, SNODAS data is received for the CONUS in a 4 km by 4 km gridded format. Referring to FIG. 4, at step 400, for each point in the grid, the data is sampled and separated into discrete time steps for conversion into a snowfall estimate. At step 402, an estimated snow/liquid ratio is then calculated for each of these discrete time steps. An exemplary process for performing this step is described in connection with FIG. 5.

At step 404, the ratios for each time sample are aggregated over the entire 24 hour sampling period. First, each time sample ratio for a given gridded point is assigned a relative weight according to the following formula:

$$w_r = \frac{1}{1 + e^{5(1-r)}} \qquad \text{Eq. 1}$$

where $w_r$ is the weighted average for the ratio of a given time sampled for a particular gridded point, and r is the snow-toliquid ratio for the given point as calculated in step 402. The weighted ratios are then summed over the 24 hour sampling period to determine a valid snow-to-liquid ratio for the entire period according to the following formula:

$$r_{24} = \sum_{t \in T_{24}} w_r r \qquad \text{Eq. 2}$$

where $r_{24}$ is the valid snow-to-liquid ratio for the entire 24 hour period for a given gridded point, and $T_{24}$ is the time period corresponding to the sampled times steps of the SNO-DAS data.

At step 406, the ratios calculated in step 404 are used to convert the liquid snow water estimates obtained in the SNO-DAS data to valid snowfall estimates. The ratio determined for each gridded point is multiplied by the corresponding value of the liquid water estimate for that gridded point. The result of this calculation is a gridded snowfall estimate valid for the CONUS.

The gridded snowfall estimates may be used to determine a snowfall estimate for any point within the CONUS. To determine such an estimate, the distances from the point where the estimate is desired and several gridded points near the desired location are calculated. Then a weighted average of the snowfall estimates for each point is taken based on it relative proximity to point of the desired estimate.

Calculate Snow-to-Liquid Ratio

Figure 5:
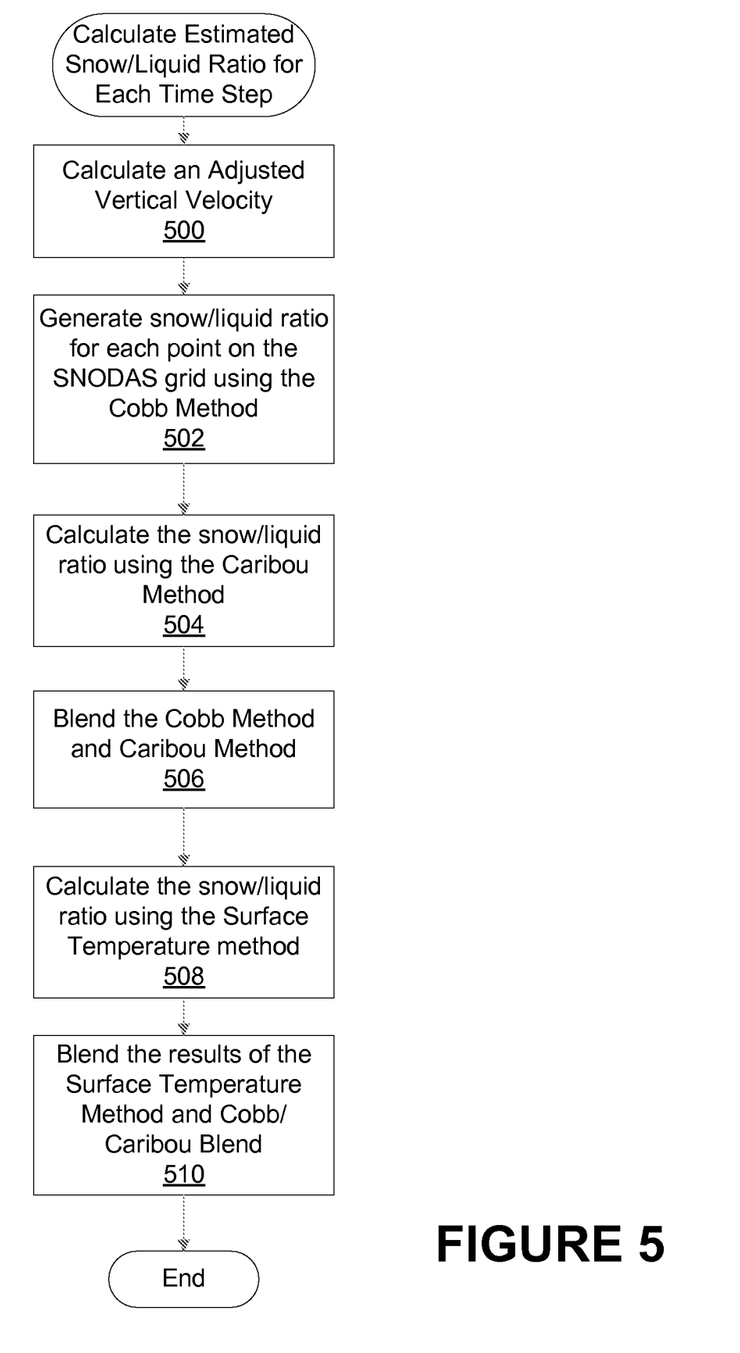
FIG. 5 is a flowchart of an illustrative method for determining an estimated snow-to-liquid estimate based on weather conditions.

An exemplary method for calculating the snow-to-liquid ratio is illustrated in FIG. 5. Such a method may be used, for example, in connection with step 402 of as described above. Generally, in an illustrative embodiment, three distinct methods are used to calculate a snow-to-liquid ratio for each point on the grid for each time sample. Using an analysis of the weather conditions, the first two methods are each given a weight and then combined to form a more accurate measurement. Then this average and the results obtained using the third method are given a second weight and averaged to determine an accurate estimate of the snow-to-liquid ratio for each point in the grid over the time domain of the sampling period. One skilled in the art can appreciate that there are many ways of determining a snow-to-liquid ratio, and the one described herein is only exemplary. For example, a constant liquid to snow ratio of 10:1 could be assumed, or a linear relationship based on temperature could be used.

Generally, the inputs to an exemplary embodiment of calculating a snow/liquid ratio takes as input atmospheric data from a numerical weather condition model. This atmospheric data may comprise, for example, the raw upward vertical velocity, atmospheric pressure, the temperature, and the relative humidity.

In an exemplary embodiment, the first method used in determining the snow-to-liquid ratio comprises a variation of the Cobb Method deriving such ratios. The Cobb Method, described in more detail in the publication *A Simple Physically Based Snowfall Algorithm*, Cobb, D., and Waldstreicher, J., 2005, 21$^{st}$ *Conference on Weather Analysis and Forecasting*/17$^{th}$ *Conference on Numerical Weather Prediction, American Meteorological Society* (the contents of which are hereby incorporated by reference in their entirety), relates the vertical distribution of the vertical velocity of a given point in a saturated region to a vertical temperature profile of that region. This relation can be used to derive a snow-to-liquid estimate for each point in the region.

In the presently described illustrative embodiment, a variation of the Cobb Method is performed wherein the upward vertical velocity as a function of atmospheric pressure of each gridded point is adjusted to create a more accurate measurement. The process is represented as step 500. If either the raw vertical velocity measured in $-\mu b/\text{sec}$ is less than zero or the temperature is greater than 0° C., the adjusted upward vertical velocity is set to 0 $-\mu b/\text{sec}$. If not, and if the relative humidity of the given point is less than 80%, than the adjusted upward vertical velocity is calculated according to the following formula:

$$\omega_{adj} = \omega \left(\frac{RH}{80}\right)^2 \qquad \text{Eq. 3}$$

where $\omega_{adj}$ is the adjusted vertical velocity in $-\mu b/\text{sec}$, $\omega$ is the raw vertical velocity in $-\mu b/\text{sec}$, and RH is the relative humidity percentage. If the raw vertical velocity is greater than or equal to zero, the temperature is less than or equal to 0° C., and the relative humidity is greater than or equal to 80% then the raw vertical velocity is deemed valid and not adjusted. This calculation is preformed for each point in the gridded area over the time domain of the samples. At step 502, the adjusted vertical velocity as a function of pressure is then used as a variable in the Cobb Method to determine an estimate of the snow-to-liquid.

At step 504, the snow-to-liquid ratio is then calculated using the Caribou Method. The Caribou Method is similar to the Cobb Method in that it uses upward vertical velocity and temperature vertical profiles to calculate the snow-to-liquid ratio for a given point within the time step. After the snow-to-liquid ratio is calculated using the Cobb Method in step 502 and the Caribou Method in step 504, two methods are then blended to determine a snow-to-liquid ratio for each point on the grid over the time domain of the sampling period. A more extensive discussion of the Caribou method is available at http://www.wdtb.noaa.gov/courses/winterawoc/IC6/lesson5/part2/player.html, the contents of which are hereby incorporated by reference in their entirety.

In step 506, the results of the Cobb and Caribou Methods are blended. This blending is based on the results obtained for the calculations using each method for a given point. If the number of ice producing layers for a given pressure is zero, or the sum of the adjusted vertical velocities for a given point in the grid for a given time sample is less than 1$-\mu b/\text{sec}$, then the Caribou Method result for the snow-to-liquid ratio is deemed valid and is used. If the sum of the adjusted vertical velocities for a given point in the grid for a given time sample is greater than 50 $-\mu b/\text{sec}$, then the Cobb method is deemed valid and its result for the snow-to-liquid ratio is used. If the sum of the adjusted vertical velocities for a given point in the grid for a given time sample is between 50 and 1 $-\mu b/\text{sec}$, then a linear blend of the two methods is determined and used for the snow-to-liquid ratio for each gridded point in that time sample. The result is a valid snow-to-liquid ratio based on the point's upward vertical velocity and temperature profiles.

At step 508, a third method used to calculate the snow-to-liquid ratio is implemented. This method calculates a snow-to-liquid ratio using on a sigmoid curve that is a function of the surface temperature. This method may be referred to as the "Surface Temperature Method." The snow-to-liquid ratio as a function of surface temperature is determined using the following formula:

$$r_{sfc} = 32\left(1 - \frac{2}{2 + e^{(30-T)/8}}\right) \quad \text{Eq. 4}$$

where $r_{sfc}$ is the calculated snow-to-liquid ratio and T is the surface temperature in degrees Fahrenheit.

At step 510, the result of step 506 (the blend of the Cobb and Caribou methods) and the ratio determined by the Surface Temperature method are then averaged together to determine a final, highly accurate snow-to-liquid ratio. The weights assigned to each of the ratios is determined using a sigmoid curve as a function of surface temperature and a sigmoid curve as a function of the ratio determined in step 506. A preliminary weight for the blended ratio calculated in step 506 is calculated using the following formula:

$$w_{blend} = 1 - \frac{6}{6 + e^{(30-T)/2}} \quad \text{Eq. 5}$$

where $w_{blend}$ is the preliminary weight for the result of the Cobb/Caribou blend.

The weight for the blended ratio is then corrected to account for the relative accuracy of the blended ratio. This correction is implemented using the following formula:

$$w_{blend} = \frac{w_{blend}}{1 + e^{5(1-r_{blend})}} \quad \text{Eq. 6}$$

where $r_{blend}$ is the blended ratio determined in step 506. Finally, the following formula is used to determine a final ratio for each point in the grid for each time sample:

$$r_{final} = w_{blend} r_{blend} + (1 - w_{blend}) r_{sfc} \quad \text{Eq. 7}$$

where $r_{final}$ is the snow-to-liquid ratio that will be used for the gridded point corresponding to the correct time sample.

Thus, Applicants have disclosed exemplary systems and methods for providing current precipitation estimates. In an exemplary embodiment, a first set of precipitation data from a system such as, for example, NWS that reflects precipitation measurements that were taken at a point in the past, is combined with a second set of precipitation data from a system such as, for example, HIRAD. The second set of precipitation data reflects precipitation measurements from at least the point at which the first set of data ended, up through a more recent point in time which may be, for example, a matter of minutes in the past from the present time. The combination of these different precipitation data sets allows for the production of rainfall and snowfall estimates for extended periods such as months, seasons, or years that provide the accuracy and comprehensiveness of the retrospective analysis provided by NWS data, but which are produced in near real-time much like HIRAD estimates.

Those skilled in the art will appreciate that the systems and methods described herein provide up-to-the-minute precipitation results. Those skilled in the art will also appreciate that over time, the precipitation results are refined as more of the higher quality precipitation data from, for example, the NWS becomes available. For purpose of illustration, during a weather event such as a storm, a system such as described herein provides precipitation data estimates that reflect recent precipitation values collected from HIRAD. Subsequent estimates will refine the preliminary estimates when the next batch of high quality NWS data becomes available. Presumably, as more of the NWS data becomes available, the estimates of the precipitation accumulation from the storm event will become more reliable. Thus, the systems and methods provide for a continuous and self-correcting precipitation estimate process. In a generic or mathematical sense, such a process may be referred to as predictor-corrector.

The preceding paragraphs describe combination systems and methods that derive and produce precipitation estimates for a given time period until present for a given geographical location. It will be appreciated by those skilled in the art that disclosed systems and methods could be implemented using numerous data sources, received in various manners, and to produce data for varying time periods for a given geographical location. The illustrative embodiments are not limiting. For instance, although use of the NWS Stage IV and NOHRSC SNODAS data for the CONUS was described in the above illustrative embodiment, other sources of data could be implemented which correspond to a larger or smaller geographical area. Additionally, a current weather estimate other than the HIRAD data described in the exemplary embodiment could be used to provide the most recent precipitation data for the accumulation estimates and still be consistent exemplary embodiments.

While the disclosure has been described in connection with the exemplary embodiments of the various figures, it is not limited thereto and it is to be understood that other similar embodiments may be used or modifications and additions may be made to the described embodiments for performing the same function as those described without deviating therefrom. Furthermore, it should be emphasized that a variety of computer platforms, including handheld device operating systems and other application specific operating systems are contemplated. Still further, the potential embodiments may be implemented in or across a plurality of processing chips or devices, and storage may similarly be effected across a plurality of devices. Moreover, computer-executable instructions for performing the methods described herein may be stored on a computer readable storage medium such as, for example, a USB drive, RAM, ROM, CD or other storage device.

Therefore, the present disclosure should not be limited to any single embodiment, but rather should be construed in breadth and scope in accordance with the appended claims. Also, the appended claims should be construed to include other variants and embodiments, which may be made by those skilled in the art without departing from the true spirit and scope of the herein disclosed system.

What is claimed:

1. A non-transitory computer readable storage medium containing computer instructions stored therein for causing a computer processor to perform a method for providing precipitation estimates, comprising:

receiving a first set of precipitation data having a first level of accuracy from a first source, the first set of precipitation data comprising data that is collected from a plurality of sources, subjected to quality control processing to obtain the first level of accuracy and updated at the first source at a first frequency, the first set of precipitation data providing precipitation values corresponding to a geographic area during a first time period beginning at a first point in time and concluding at a second point in time;

receiving a second set of precipitation data having a second level of accuracy from a second source, the second source being different than the first source, the second set of precipitation data comprising data that is updated at the second source at a second frequency, the second level of accuracy being less than the first level of accuracy, the second set of precipitation data providing precipitation values corresponding to the geographic area and for a second period of time spanning the second point in time to a third point in time; and aggregating the first set of precipitation data and the second set of precipitation data to provide a near real-time precipitation estimate for the geographic area, wherein the first frequency at which the first set of precipitation data is updated at the first source is less than the second frequency at which the second set of precipitation data is updated at the second source.

2. The non-transitory computer readable storage medium of claim 1, wherein receiving a first set of precipitation data comprises receiving data comprising liquid precipitation accumulation data.

3. The non-transitory computer readable storage medium of claim 2, wherein receiving a second set of precipitation data comprises receiving data comprising liquid precipitation accumulation data.

4. The non-transitory computer readable storage medium of claim 1, wherein receiving a first set of precipitation data comprises receiving data comprising snow precipitation accumulation data.

5. The non-transitory computer readable storage medium of claim 4, wherein receiving a second set of precipitation data comprises receiving data comprising snow precipitation accumulation data.

6. The non-transitory computer readable storage medium of claim 4, wherein receiving data comprising snow precipitation accumulation data comprises receiving liquid snow water equivalent data, and further comprising converting the received liquid snow water equivalent data to snowfall accumulation data.

7. The non-transitory computer readable storage medium of claim 6, wherein converting the received liquid snow water equivalent data comprises:

sampling the liquid snow water equivalent data in discrete time steps;

calculating an estimated snow-to-liquid ratio for the snow water equivalent data for each time step; and aggregating the estimated snow-to-liquid ratios for each time step into a single value valid for the sampling period.

8. The non-transitory computer readable storage medium of claim 7, wherein calculating an estimated snow-to-liquid ratio for each time step further comprises:

calculating a first snow-to-liquid estimate for each point in the geographic area using a weighted average relating the vertical distribution of the adjusted vertical velocity of each point in saturated regions to a vertical temperature profile of the saturated regions;

calculating a second snow-to-liquid estimate for each point based on a logistic curve that is a function of surface temperature; and calculating a weighted average of the first and second snow-to-liquid estimates based on the surface temperature of the given point.

9. The non-transitory computer readable storage medium of claim 1, wherein receiving a first set of precipitation data comprises receiving data comprising liquid precipitation accumulation data and receiving data comprising snow precipitation accumulation data.

10. The non-transitory computer readable storage medium of claim 9, wherein receiving a second set of precipitation data comprises receiving data comprising liquid precipitation accumulation data and receiving data comprising snow precipitation accumulation data.

11. The non-transitory computer readable storage medium of claim 1, wherein receiving a first set of precipitation data comprises receiving precipitation data for each of a plurality of locations, wherein receiving a second set of precipitation data comprises receiving precipitation data for each of the plurality of locations, and wherein aggregating the first set of precipitation data and the second set of precipitation data comprises aggregating data from the first set of precipitation data with data from the second set of precipitation data for each of the plurality of locations.

12. The non-transitory computer readable storage medium of claim 11, wherein receiving precipitation data for each of a plurality of locations comprises receiving precipitation data for a grid of locations for which precipitation data is collected.

13. The non-transitory computer readable storage medium of claim 1, wherein aggregating the first set of precipitation data and the second set of precipitation data comprises:

aggregating data from the first set of precipitation data corresponding to the first time period;

aggregating data from the second set of precipitation data corresponding to the second time period; and aggregating data aggregated from the first set of precipitation data and with data aggregated from the second set of precipitation data.

14. The non-transitory computer readable storage medium of claim 1, wherein receiving a second set of precipitation data comprises receiving a plurality of data sets; and wherein aggregating the first set of precipitation data and the second set of precipitation data comprises aggregating the plurality of data sets and aggregating the aggregated plurality of data sets with data from the first set of precipitation data.

15. The non-transitory computer readable storage medium of claim 1, wherein the first set of precipitation data from the first source is not received during the second period of time.

16. The non-transitory computer readable storage medium of claim 1, wherein the first frequency is approximately once daily and the second frequency is at least once hourly.

17. A system for providing precipitation estimates, comprising:

a processor;

computing memory communicatively coupled with the processor, the computing memory having stored therein instructions executable by the processor for performing the following:

creating a database of a first set of precipitation data received from a first source having a first level of accuracy, the first set of precipitation data comprising data that is collected from a plurality of sources, subjected to quality control processing to obtain the first level of accuracy and updated at the first source at a first frequency, the first set of precipitation data comprising data corresponding to a time period ending at a first time;

creating a database of a second set of precipitation data received from a second source having a second level of accuracy, the second set of precipitation data comprising data that is updated at the second source at a second frequency, the second source being different than the first source, the second level of accuracy being less than the first level of accuracy, the second set of precipitation data comprising data corresponding to a time period spanning at least from the first time to a more recent time; and aggregating data from the first set of precipitation data to create a precipitation accumulation value for a time period ending at the first time;

aggregating data from the second set of precipitation data to create a precipitation accumulation value for a time period from the first time to a more recent time; and aggregating the precipitation accumulation value for a time period ending at the first time and the precipitation accumulation value for a time period from the first time to a more recent time to provide a near real-time precipitation estimate for a geographic area, wherein the first frequency at which the first set of precipitation data is updated at the first source is less than the second frequency at which the second set of precipitation data is updated at the second source.

18. The system of claim 17, wherein creating a database of a first set of precipitation data received from a first source comprises creating a database of liquid precipitation data or snow precipitation data.

19. The system of claim 18, wherein the computing memory has stored therein instructions executable by the processor for further performing the following: converting received liquid snow water equivalent data to snowfall accumulation data.

20. The system of claim 17, wherein the first frequency is approximately once daily and the second frequency is at least once hourly.

* * * * *